(12) United States Patent  
Satou et al.

(10) Patent No.: US 8,863,384 B2
(45) Date of Patent: Oct. 21, 2014

(54) SEAL PACKING ASSEMBLY APPARATUS AND METHOD OF ASSEMBLY OF SEAL PACKING

(75) Inventors: Yasuyuki Satou, Chita-County (JP); Ryuji Tateishi, Chita-County (JP)

(73) Assignee: Denso Corporation, Kariya (JP)

( * ) Notice: Subject to any disclaimer, the term of this patent is extended or adjusted under 35 U.S.C. 154(b) by 139 days.

(21) Appl. No.: 13/587,421

(22) Filed: Aug. 16, 2012

(65) Prior Publication Data

US 2013/0055569 A1 Mar. 7, 2013

(30) Foreign Application Priority Data

Sep. 5, 2011 (JP) .................................. 2011-192881

(51) Int. Cl.
*B23P 15/26* (2006.01)
*F28F 9/02* (2006.01)
(52) U.S. Cl.
CPC ............... *B23P 15/26* (2013.01); *F28F 9/0226* (2013.01)
USPC ............................. 29/890.03; 29/450; 29/726
(58) Field of Classification Search
CPC ......... B21D 53/02; B23P 15/26; B23P 19/04; B23P 19/047; F28D 9/00; F28D 9/0093
USPC ...................... 29/235, 450, 726, 727, 890.03, 29/890.043, 890.045, 898.11; 165/149, 165/162, 173, 175; 72/365.2; 277/323
See application file for complete search history.

(56) References Cited

U.S. PATENT DOCUMENTS

| | | | | |
|---|---|---|---|---|
| 4,125,280 A | * | 11/1978 | Kuzel | 285/124.3 |
| 4,455,728 A | * | 6/1984 | Hesse | 29/890.03 |
| 4,600,051 A | * | 7/1986 | Wehrman | 165/149 |
| 4,649,628 A | * | 3/1987 | Allemandou | 165/148 |
| 4,897,913 A | * | 2/1990 | St. Angelo et al. | 29/450 |
| 5,152,339 A | * | 10/1992 | Calleson | 165/173 |
| 5,195,582 A | * | 3/1993 | Haase | 165/173 |
| 6,421,894 B1 | * | 7/2002 | Tsujimoto et al. | 29/33 K |
| 8,020,607 B2 | * | 9/2011 | Kim et al. | 165/79 |
| 2008/0053645 A1 | * | 3/2008 | Hakamata et al. | 165/173 |
| 2008/0121386 A1 | * | 5/2008 | Hakamata et al. | 165/173 |
| 2009/0255657 A1 | * | 10/2009 | Hakamata et al. | 165/178 |

FOREIGN PATENT DOCUMENTS

JP U-63-138934 9/1988
JP U-02-110432 9/1990

* cited by examiner

Primary Examiner — Alexander P Taousakis
(74) Attorney, Agent, or Firm — Oliff PLC

(57) ABSTRACT

A seal packing assembly apparatus which assembles a seal packing into a core plate used as a component of a heat exchanger, which apparatus is provided with rollers which push a seal packing into a groove of a core plate while moving by rolling along the groove and guide members which abut against the core plate, the rollers being supported so as to displace along the shape of the core plate by the reaction force which the guide members receive from the core plate, whereby the reliably of assembly of the seal packing is improved.

3 Claims, 14 Drawing Sheets

A-A

A-A

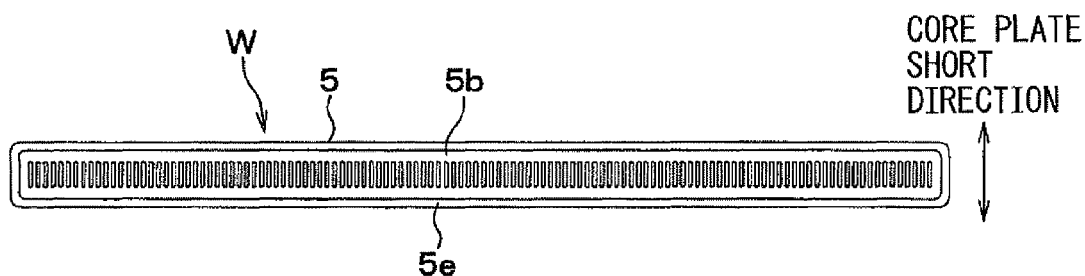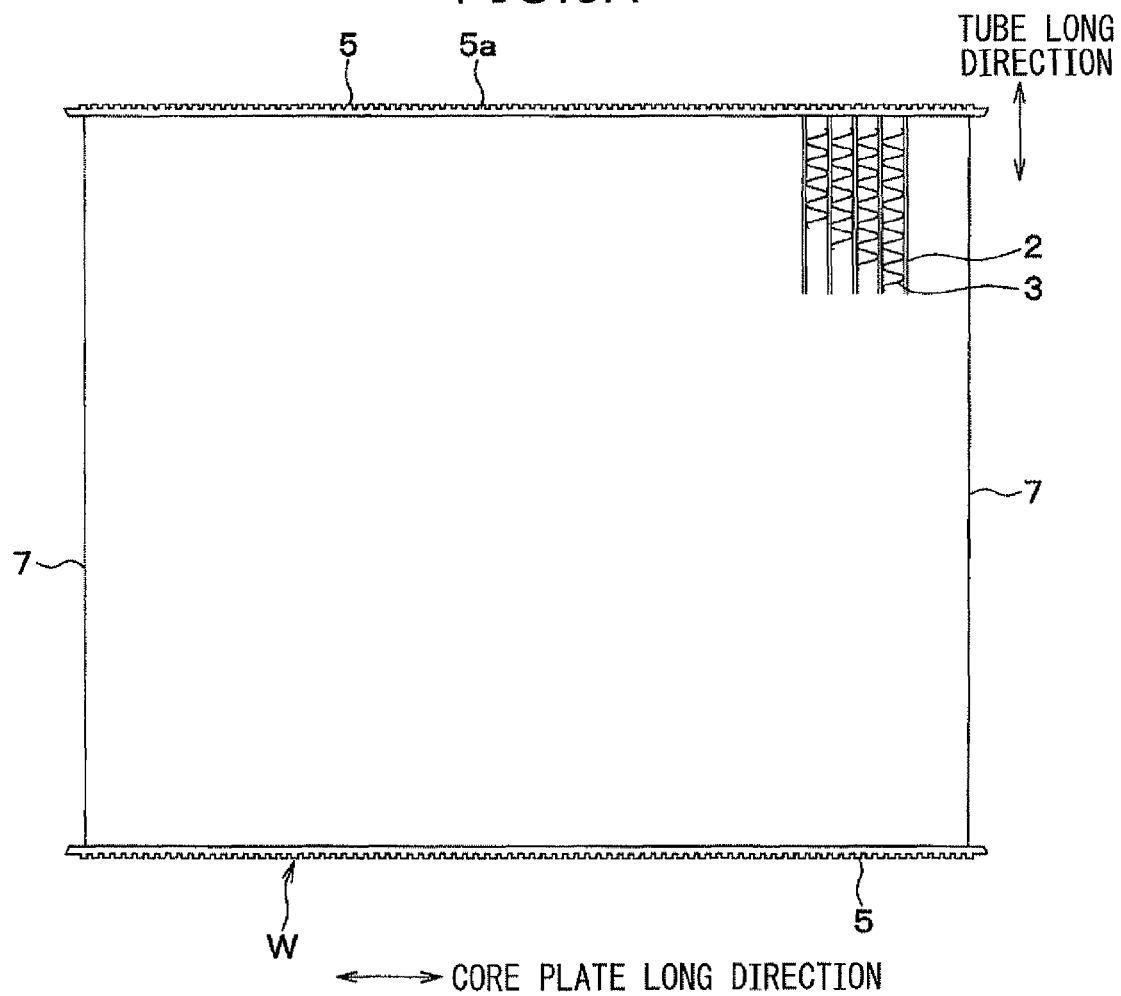

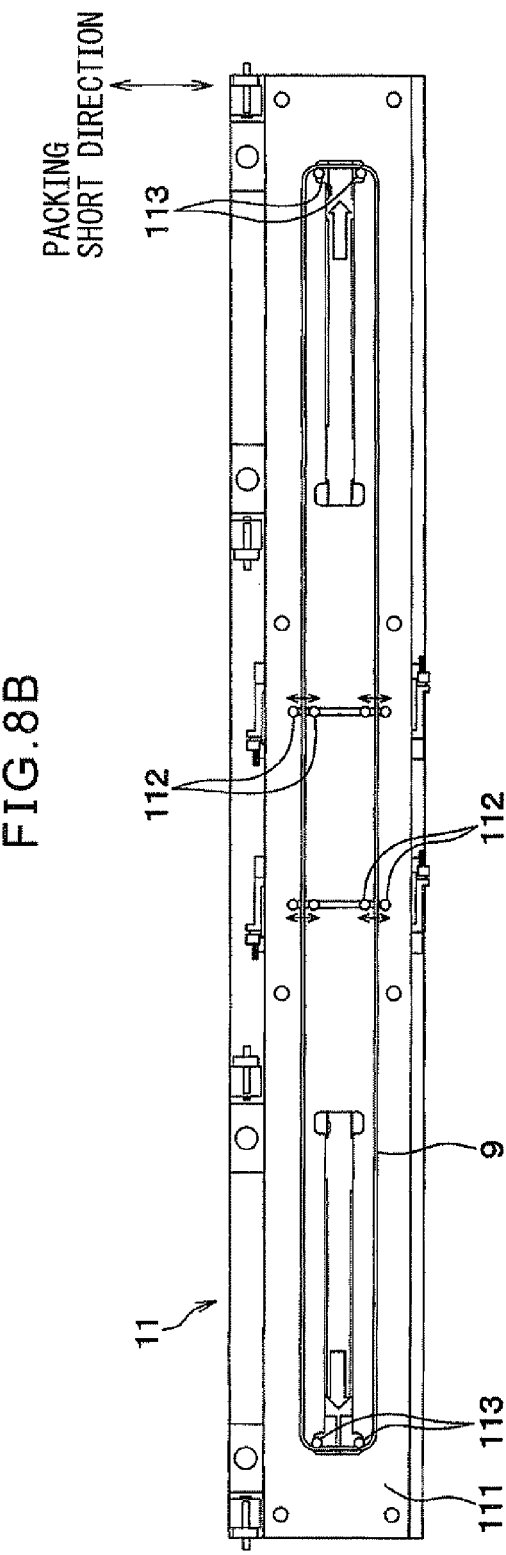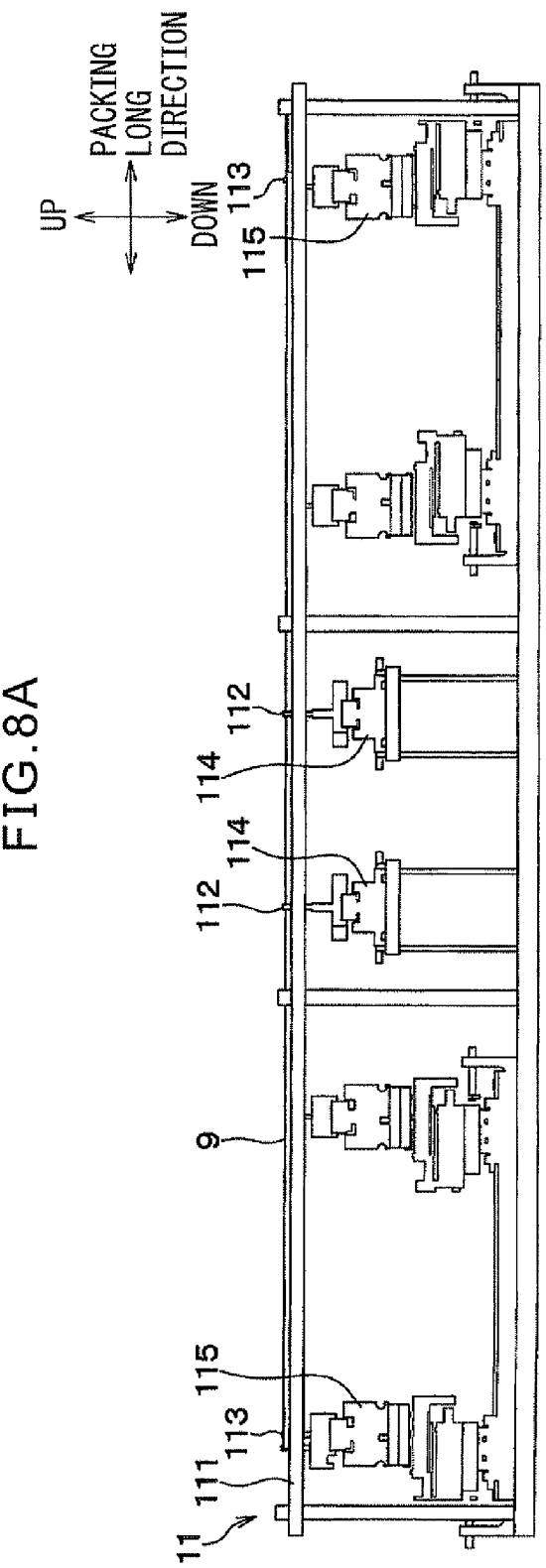

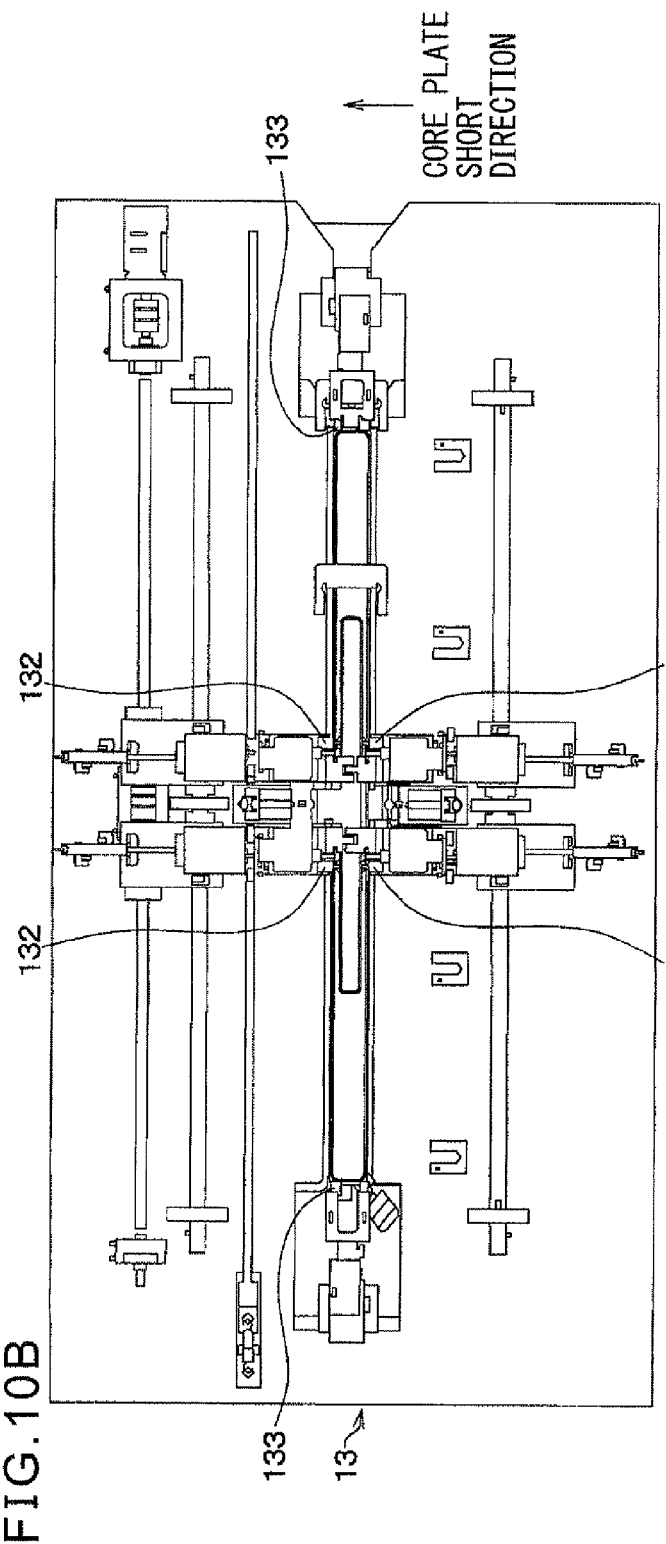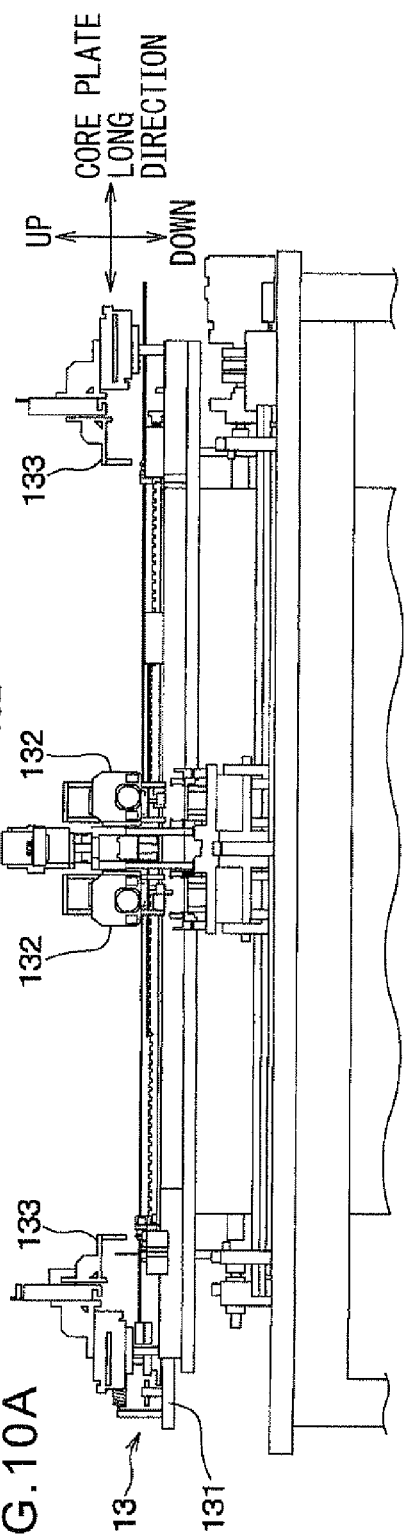

SEAL PACKING ASSEMBLY APPARATUS AND METHOD OF ASSEMBLY OF SEAL PACKING

BACKGROUND OF THE INVENTION

1. Field of the Invention

The present invention relates to an assembly apparatus which assembles seal packing at a core plate (back plate) which forms a tank of a heat exchanger and a method of assembly of seal packing using the same.

2. Description of the Related Art

In the past, Japanese Utility Model Publication No. 2-110432 U describes an assembly apparatus and a method of assembly of seal packing. In this prior art, the seal packing is gripped by a gripping mechanism and conveyed to above a core plate, then the gripping mechanism is opened to make the seal packing drop and thereby insert the seal packing into a ring-shaped groove of the core plate.

However, in the above prior art, the seal packing is made to drop from above the core plate, so there is no guarantee that the seal packing can be reliably inserted into the ring-shaped groove of the core plate.

For example, when the side walls of the ring-shaped groove of the core plate have oil deposited on them, the seal packing can end up sticking to the side walls and not dropping to the bottom of the ring-shaped groove.

Further, for example, when the core plate deforms by heat when soldering the tubes to the core plate in the previous step, the seal packing may end up deviating from the ring-shaped groove of the core plate.

SUMMARY OF THE INVENTION

The present invention was made in consideration of the above point and has as its object the improvement of the reliability of assembly of seal packing.

To achieve the above object, in the aspect of the invention which is described in claim 1, there is provided a seal packing assembly apparatus which assembles a seal packing (9) into a core plate (5) used as a component of a heat exchanger, which apparatus is provided with rollers (132a) which push a seal packing (9) into a groove (5e) of a core plate (5) while moving by rolling along the groove (5e) and guide members (132b, 132c, 132d) which abut against the core plate (5), the rollers (132a) being supported so as to displace along the shape of the core plate (5) by the reaction force which the guide members (132b, 132c, 132d) receive from the core plate (5).

According to this, the rollers (132a) displace along the shape of the core plate (5), so even if the core plate (5) deforms, the rollers (132a) can be kept from deviating from the groove (5e) of the core plate (5). For this reason, the reliability of assembly of the seal packing (9) can be improved.

For example, it is sufficient that the guide members (132b, 132c, 132d) abut against the core plate (5) in the short direction of the core plate (5) and that the rollers (132a) be supported so as to displace in the short direction of the core plate (5) by the reaction force which the guide members (132b, 132c, 132d) receive from the core plate (5).

According to this, even if the core plate (5) warps in the short direction, the roller (132a) can be made to move by rotating along the groove (5e) of the core plate (5). For this reason, twisting of the seal packing (9) can be suppressed.

For example, it is sufficient that the guide members (132b, 132c, 132d) abut against the core plate (5) in the thickness direction and that the rollers (132a) be supported so as to displace in the thickness direction of the core plate (5) by the reaction force which the guide members (132b, 132c, 132d) receive from the core plate (5).

According to this, even if the core plate (5) warps in the thickness direction, the amount by which the seal packing (9) is pushed in by the rollers (132a) can be made close to constant. For this reason, the seal packing (9) can be kept from rising up.

In the aspect of the invention as set forth in claim 2, there is provided the seal packing assembly apparatus as set forth in claim 1 wherein the rollers (132a) move by rolling from the center side of the groove (5e) in the long direction to the two end sides in the long direction.

According to this, if there is an extra length in the seal packing (9), the extra length of the seal packing (9) can be shifted to the two ends of the groove (5e) in the long direction. For this reason, it is possible to kept the extra length of the seal packing (9) from sticking out from the center side of the groove (5e) in the long direction.

In the aspect of the invention as set forth in claim 3, there is provided the seal packing assembly apparatus as set forth in claim 2 which is provided with pushers (133a) which push the two ends, in the long direction, of the seal packing (9), which has been pushed into the groove (5e) by the rollers (132a), into the two ends of the groove in the long direction.

According to this, the extra length of the seal packing (9) can be pushed into the two ends of the groove in the long direction, so the extra length of the seal packing (9) can be kept from sticking out from the groove (5e) even at the two ends in the long direction.

In the aspect of the invention as set forth in claim 4, there is provided the seal packing assembly apparatus as set forth in claim 1 which is provided with a provisional placement table (111) on which the seal packing (9) is provisionally placed, an extending mechanism (113) which evenly extends the seal packing (9), which was provisionally placed on the provisional placement table (111), in both directions in the long direction, and conveying means (12) which grip the seal packing (9) which was evenly extended by the extending mechanism (113) in both directions in the long direction and convey it to near the core plate (5).

Due to this, the seal packing (9) can be picked up at the center position in the long direction, so the extra length of the seal packing (9) can be evenly distributed to the two ends of the groove (5e) in the long direction.

The aspect of the invention as described in claim 5 uses the seal packing assembly apparatus as set forth in any one of claims 1 to 4 to assemble a seal packing (9) in the core plate (5).

Above, the present invention was explained for the case of application as an invention of a seal packing assembly apparatus and a method of assembly of seal packing, but the present invention can also be applied as an invention of a production system of a heat exchanger and a method of production of a heat exchanger.

Note that the reference notations in parentheses after the means described in this section show correspondence with the specific means in the later explained embodiments.

BRIEF DESCRIPTION OF DRAWINGS

These and other objects and features of the present invention will become clearer from the following description of the preferred embodiments given with reference to the attached drawings, wherein:

FIGS. 5A and 5B are views of a workpiece W which is obtained by a soldering step;

FIGS. 8A and 8B are views of a provisional placement station;

FIGS. 10A and 10B are views of an assembly station;

DESCRIPTION OF THE PREFERRED EMBODIMENTS

Below, an embodiment will be explained. In the present embodiment, the seal packing assembly apparatus and method of assembly of seal packing according to the present invention will be explained with reference to the example of the case of application to an assembly process of an automobile radiator which exchanges heat between engine cooling water and air and cools the engine cooling water.

Figure 1:
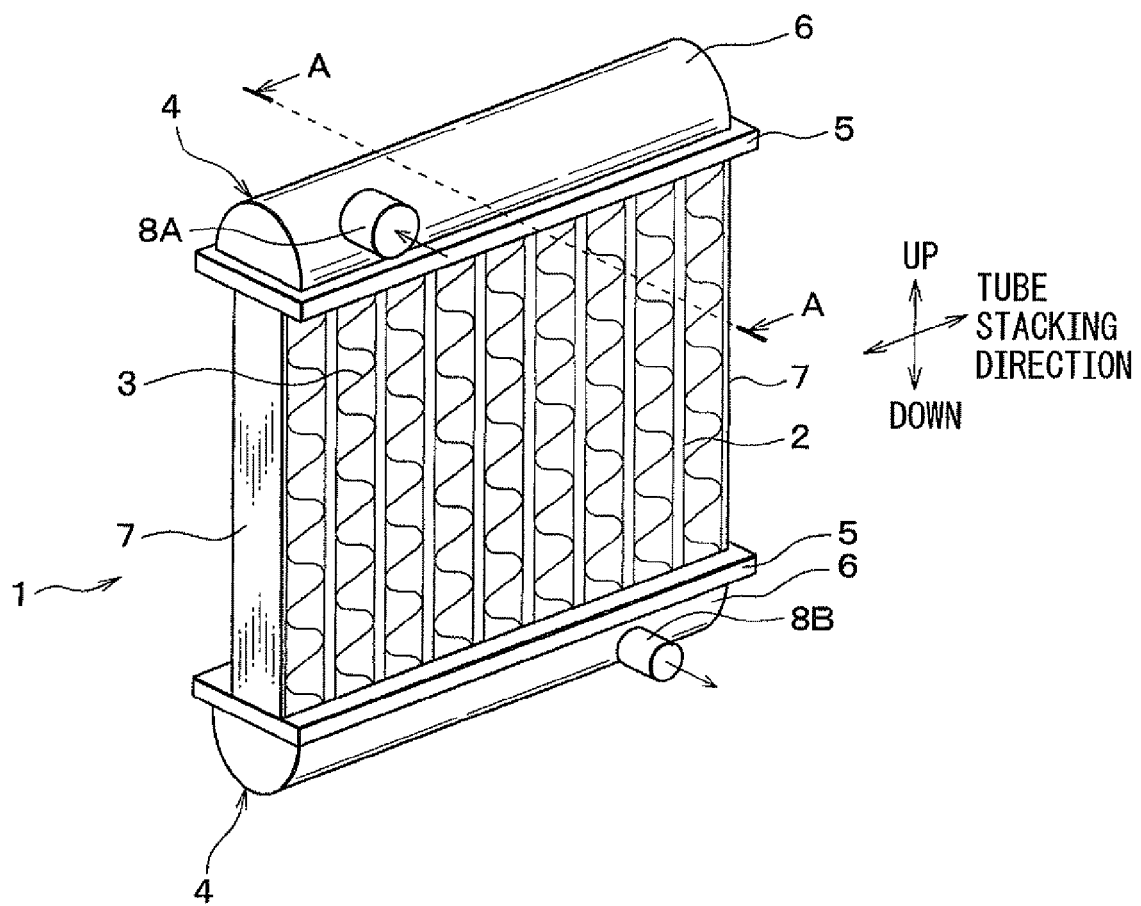
FIG. 1 is a perspective view of radiator which is assembled using the seal packing assembly apparatus in an embodiment.

FIG. 1 is a perspective view which shows a radiator according the present embodiment. As shown in FIG. 1, the radiator 1 of the present embodiment has a core part which is comprised of a plurality of tubes 2 and fins 3 and a pair of header tanks 4 which are arranged assembled at the two ends of the core part.

The tubes 2 are tubes through which a fluid (in the present embodiment, engine cooling water) flows. The tubes 2 are formed flattened so that the flow direction of air matches with the long axis direction. A plurality are arranged in parallel so that the long direction matches the vertical direction.

The fins 3 are formed in corrugated shapes and are joined with the flat surfaces at the two sides of the tubes 2. Due to the fins 3, the heat transfer area with the air is increased and heat exchange between the engine cooling water which flows through the insides of the tubes 2 and the air is promoted.

The header tanks 4 extend at the two ends of the tubes 2 in the long direction (below, called the "tube long direction") in a direction perpendicular to the tube long direction and communicate with a plurality of tubes 2. In the present embodiment, the header tanks 4 are arranged at the top and bottom ends of the tubes 2 and communicate with a plurality of tubes 2 which extend in the horizontal direction. Each header tank 4 is comprised of a core plate 5 in which the tubes 2 are joined by insertion and a tank body 6 which forms a tank space together with the core plate 5.

Further, at the two ends of the core parts in the stacking direction of the tubes 2, side plates 7 are provided which reinforce the core parts. The side plates 7 extend in parallel to the tube long direction and are connected at the two ends to the header tanks 4.

Among the pair of header tanks 4, the header tank which is arranged at the upper side is provided with a cooling water inflow port 8A through which engine cooling water is made to flow into the space inside the tank. Among the pair of header tanks 4, the header tank which is arranged at the lower side is provided with a cooling water outflow port 8B through which engine cooling water is made to flow out from the space inside of the tank.

Figure 2:
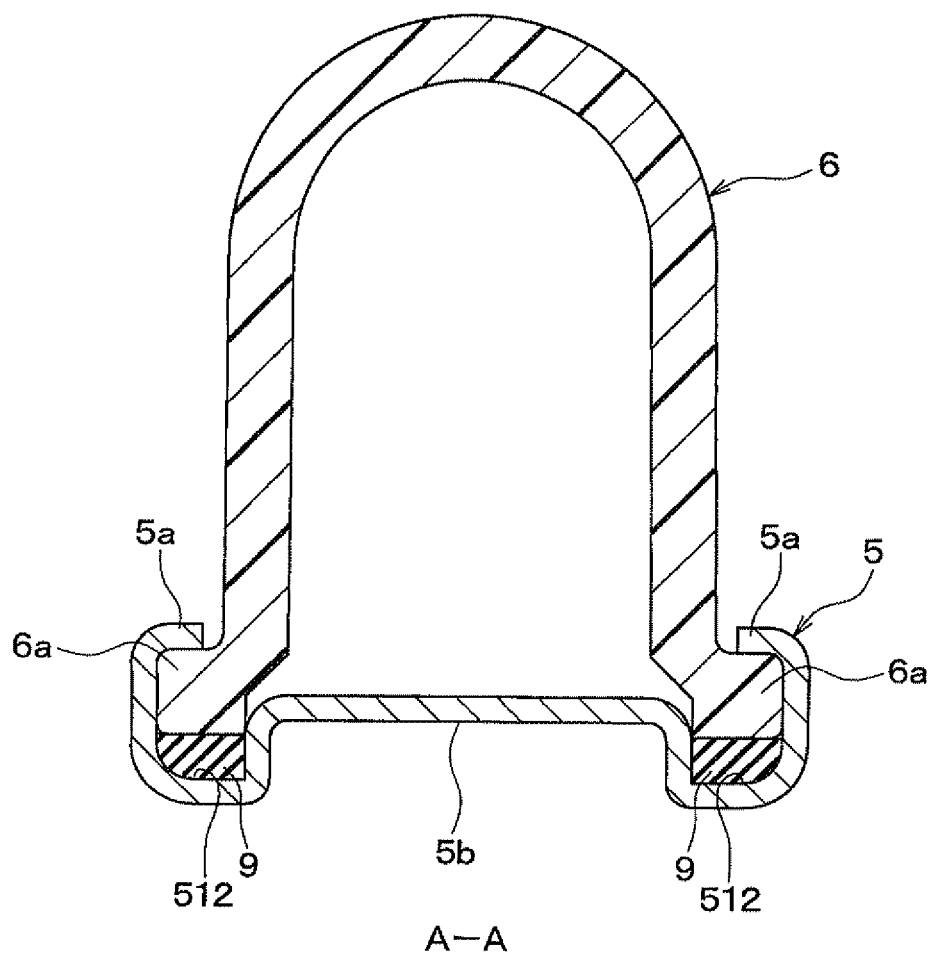
FIG. 2 is a cross-sectional view along a line A-A of FIG. 1.

Next, the detailed configuration of a header tank 4 will be explained. FIG. 2 is a cross-sectional view along the line A-A of FIG. 1.

A header tank 4 has a core plate 5 with which the tubes 2 and side plates 7 are joined by insertion, a tank body 6 which forms a space inside the header tank 4 together with the core plate 5, that is, a space inside the tank, and seal packing 9 used as a seal member which seals the space between the core plate 5 and the tank body 6.

Further, the core plate 5 is made from an aluminum alloy, while the tank body 6 is made from a plastic which is reinforced by glass fiber such as glass reinforced polyamide. Rubber seal packing 9 is sandwiched between the core plate 5 and the tank body 6. In that state, the projecting pieces 5a of the core plate 5 are plastically deformed so as to push against the tank body 6 to swage the tank body 6 to the core plate 5. The seal packing 9 is a seal member which is comprised of elastic deformable rubber.

Figure 3B:
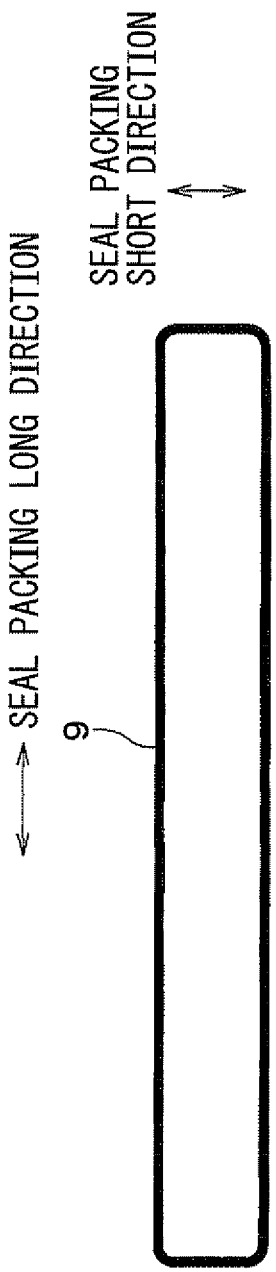
FIGS. 3A and 3B are plan views which shows the state of the core plate and seal packing.
Figure 3A:
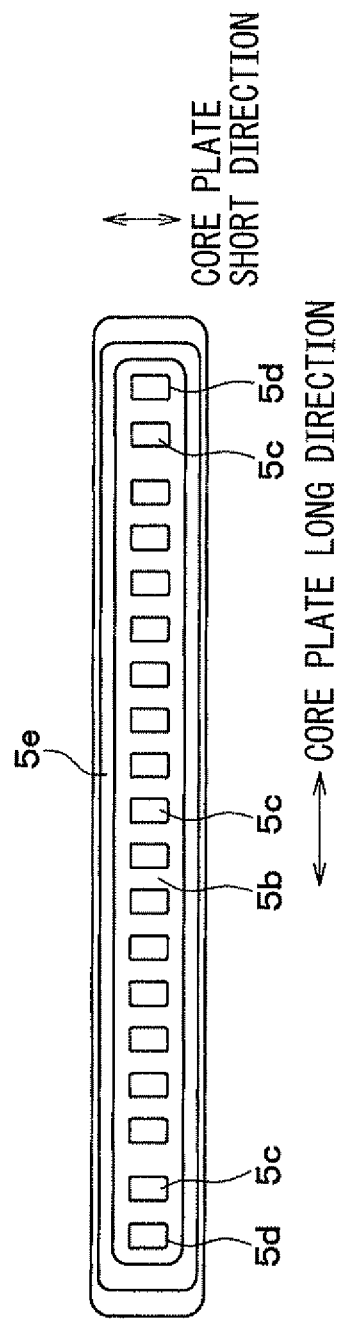

FIGS. 3A and 3B are plan views which show the state of the core plate 5 and seal packing 9 unassembled. As shown in FIG. 3A, the core plate 5 forms a rectangular shape in planar shape. The stacking direction of the tubes 2 forms the long direction.

The core plate 5 has a tube joining face 5b to which the tubes 2 are joined. The tube joining face 5b is formed along the tube stacking direction with a large number of tube insertion holes 5c into which tubes 2 are to be inserted and soldered. Furthermore, the tube joining face 5b is formed with side plate insertion holes 5d into which side plates 7 are to be inserted and soldered, one each, at the two end sides of the tube stacking direction at the tubes joining face 5b.

Around the tube joining face 5b, a groove 5e into which a seal packing 9 is to be inserted is formed over the entire circumference of the core plate 5. The groove 5e forms a rectangular ring shape in planar shape. Around the groove 5e, a large number of projecting pieces 5a are formed. A skirt part 6a of the tank body 6 is formed in a rectangular ring shape so as to surround the space inside the tank.

The seal packing 9 is formed in a rectangular ring shape in planar shape. The seal packing 9 is an elongated elastic member, so in the state before assembly, it is extremely easily bent, twisted, stretched, or otherwise deformed. While the illustration is omitted, in this example, the seal packing 9 forms an angular shape in cross-sectional shape, that is, is a so-called angular packing.

Figure 4A:
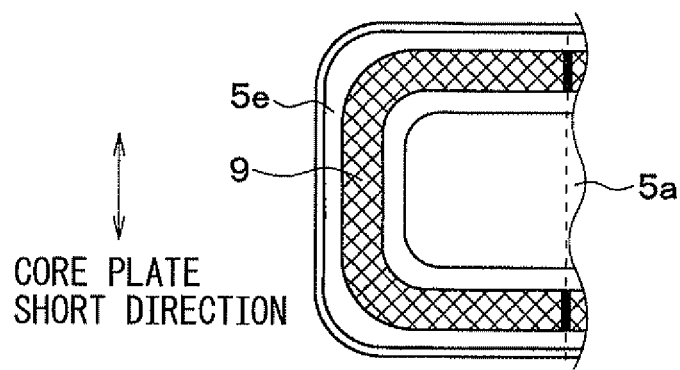
FIGS. 4A and 4B are plan views of the core plate to which the seal packing is assembled.

As shown in FIG. 4A, a width dimension of the groove 5e is larger by a predetermined amount than a width dimension of the seal packing 9 in the unassembled state. For this reason, in design values, a circumferential length of the groove 5e is larger by a predetermined amount than a circumferential length of the seal packing 9.

Figure 4B:
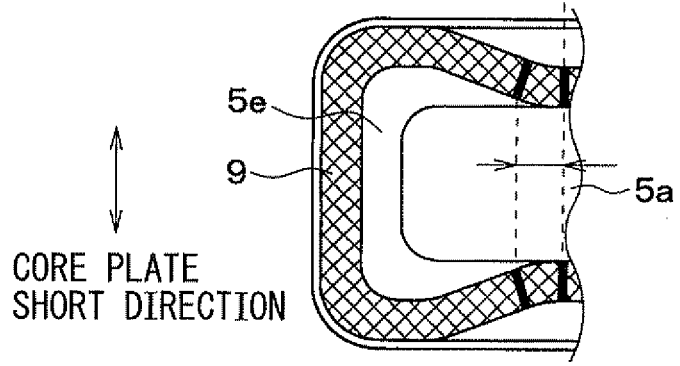

The seal packing 9 becomes larger than the design values due to the manufacturing tolerances, heat expansion due to the ambient temperature, etc. It sometimes have an extra length compared with the groove 5e. This extra length, as shown in FIG. 4B, can be absorbed by the difference between the circumferential length of the groove 5e and the circumferential length of the seal packing 9 (circumferential length difference).

Next, the method of production of a radiator 1 will be briefly explained. First, tubes 2, fins 3, side plates 7, and core plates 5 are provisionally assembled, then are soldered together (soldering step).

FIG. 5 shows the tubes 2, fins 3, side plates 7, and core plates 5 obtained by the soldering step (below, called the "workpiece W"). For convenience in illustration, in FIG. 5, details of the tubes 2, fins 3, and side plates 7 are omitted.

The core plates 5 of the workpiece W deform due to the heat at the time of soldering. For example, the core plates 5 warp in the thickness direction (in other words, tube long direction) and short direction.

After the soldering step, seal packings 9 are inserted into the grooves 5e of the core plates 5 of the workpiece W (seal packing assembly step).

Next, skirt parts 6a of the tank bodies 6 are inserted into the grooves 5e of the core plates 5 of the workplaces W (tank body assembly step). At this time, the seal packings 9 are sandwiched between the core plates 5 and the tank bodies 6.

Next, the seal packings 9 are sandwiched between the core plates 5 and the tank bodies 6. The projecting pieces 5a of the core plates 5 are plastically deformed to press against the tank bodies 6 so as to swage the tank bodies 6 to the core plates 5 (swaging step). In this way, the radiator 1 finishes being produced.

Figure 6:
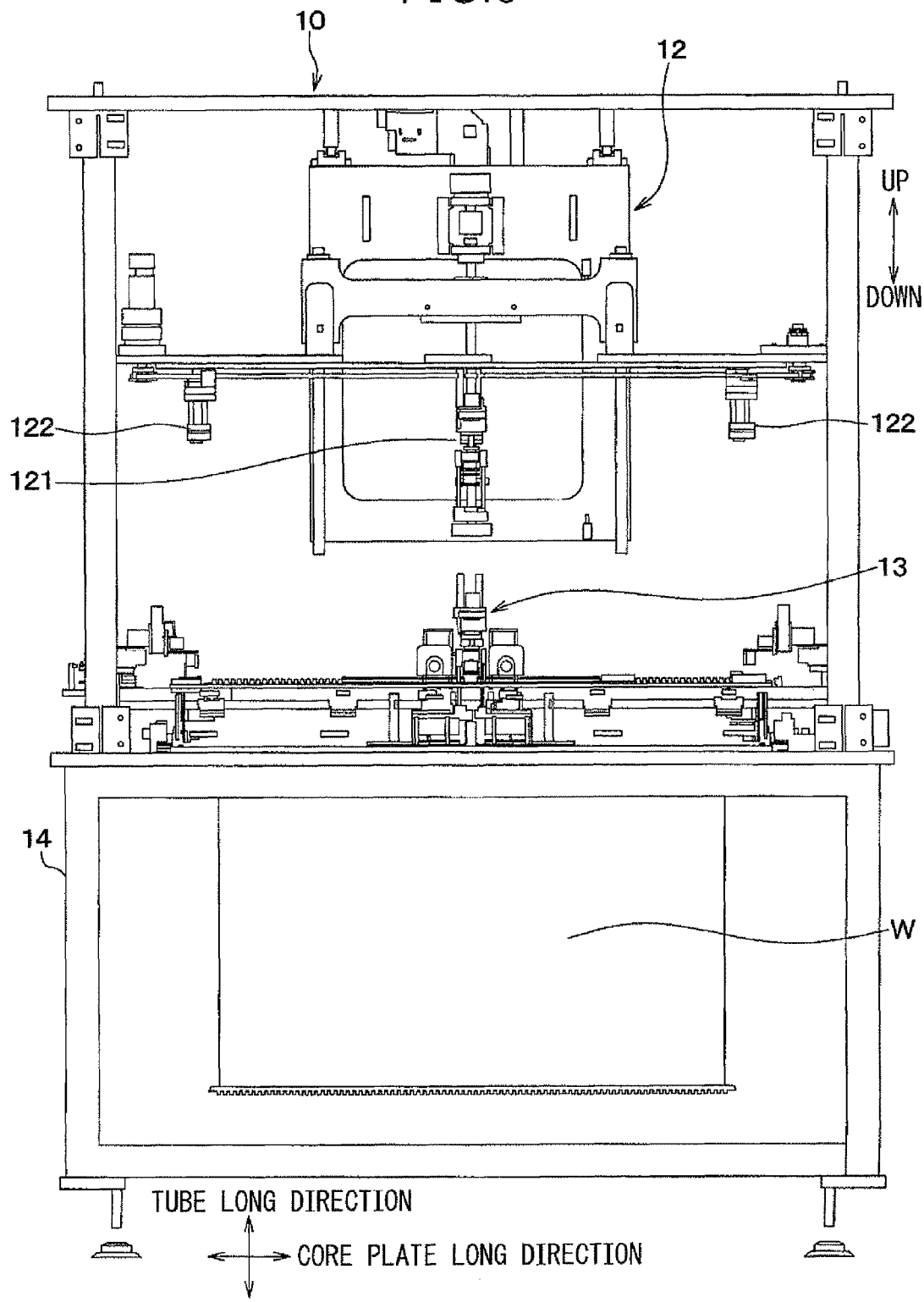
FIG. 6 is a front view of a seal packing assembly apparatus.
Figure 7:
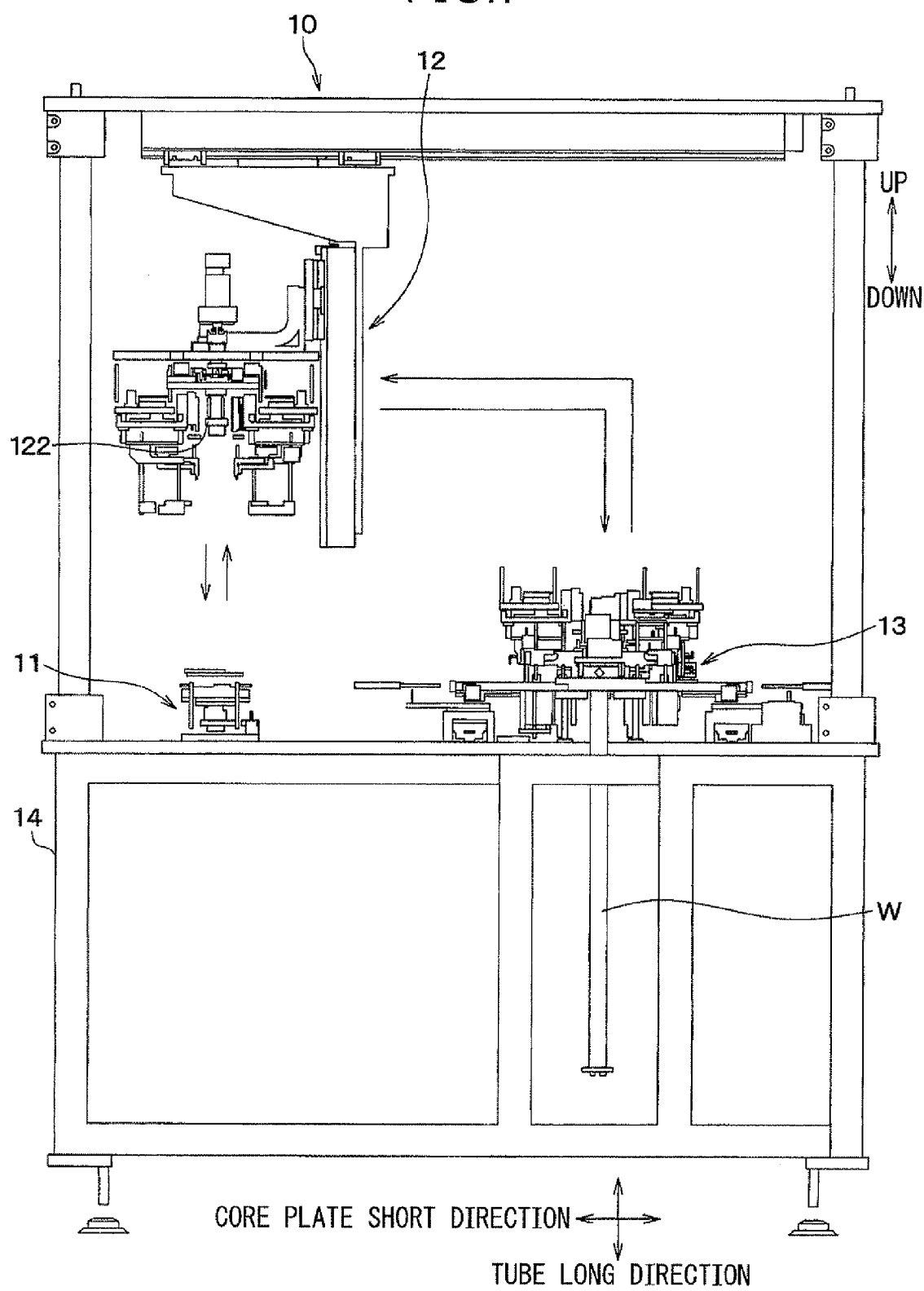
FIG. 7 is a side view of a seal packing assembly apparatus.

Next, the seal packing assembly apparatus which is used in the seal packing assembly step will be explained. FIG. 6 is a front view of the seal packing assembly apparatus 10 in the present embodiment, while FIG. 7 is a side view of the seal packing assembly apparatus 10.

The seal packing assembly apparatus 10 can be roughly divided into a provisional placement station 11, conveyor loader 12, assembly station 13, base 14, and control device (not shown). The provisional placement station 11, conveyor loader 12, and assembly station 13 are attached to a base 14.

At the provisional placement station 11, a seal packing 9 is centered and positioned in the long direction. The conveyor loader 12 is a conveying means which conveys the seal packing 9 from the provisional placement station 11 to the assembly station 13. At the assembly station 13, the seal packing 9 which was conveyed by the conveyor loader 12 is assembled into a core plate 5 of the workpiece W.

FIGS. 8A and 8B are views of a provisional placement station 11. The provisional placement station 11 is provided with a provisional placement table 111 and movable pins 112, 113.

On the provisional placement table 111, a seal packing 9 is placed by a worker. The movable pins 112 are positioned near the center part, in the long direction, of the seal packing 9 which is placed on the provisional placement table 111 and are driven by the actuator 114. The movable pins 113 are positioned near the two ends of the seal packing 9 which is placed on the provisional placement table 111 and are driven by the actuator 115.

The movable pins 112 which are positioned near the center part of the seal packing 9 in the long direction can move in the short direction of the seal packing 9 (up-down direction FIG. 8B) and grip the vicinity of the center part of the seal packing 9 in the long direction and position it in the short direction of the seal packing 9.

The movable pins 113 which are positioned near the two ends of the seal packing 9 in the long direction can move in the long direction of the seal packing 9 (left-right direction of FIG. 8B) and evenly extend the seal packing 9 in both directions in the long direction. In other words, the movable pins 113 form an extending mechanism which extends the seal packing 9 evenly in both directions in the long direction.

Figure 9A:
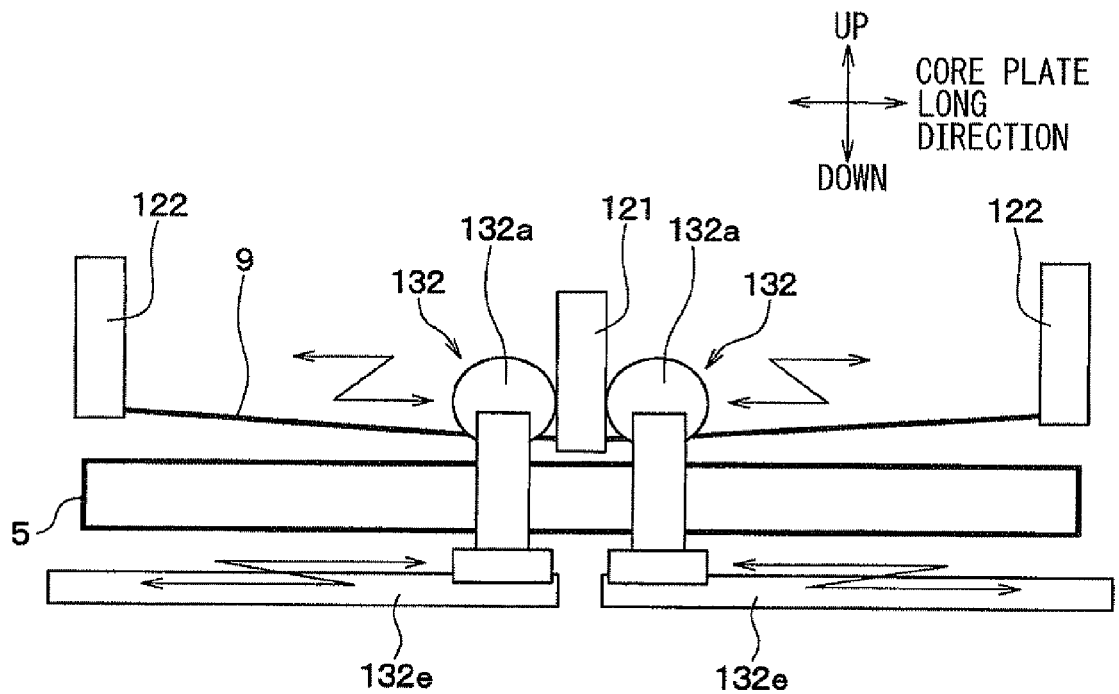
FIGS. 9A and 9B are schematic views which show a conveyor loader and assembly station.
Figure 9B:
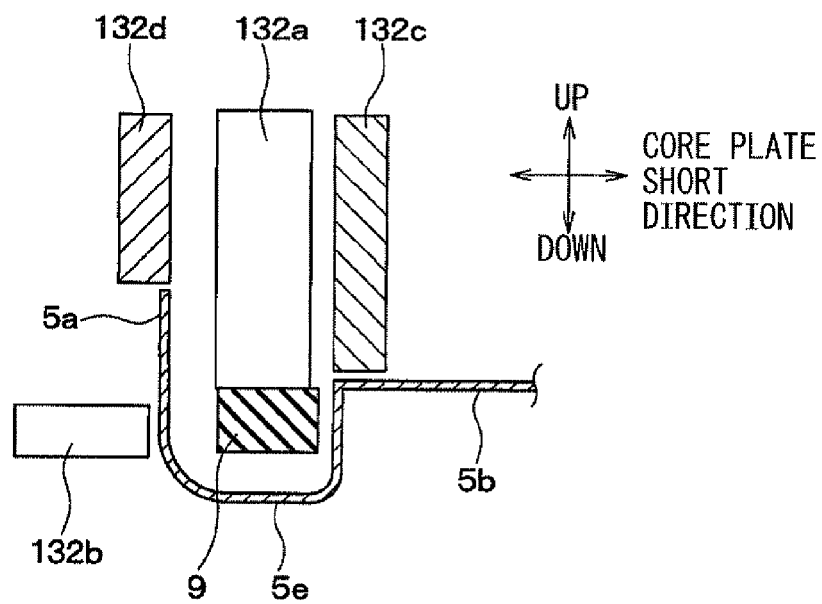

FIGS. 9A and 9B are schematic views which show a conveyor loader 12 and assembly station 13. The conveyor loader 12 has a center chuck 121 and two end chucks 122.

The center chuck 121 grips the center part of the seal packing 9 in the long direction. At this time, the seal packing 9 is evenly extended by the movable pins 112, 113 of the provisional placement station 11 in both directions in the long direction, so it is possible to mechanically pick up the center position of the seal packing 9 in the long direction. The two end chucks 122 grip the two ends of the seal packing 9 in the long direction.

The conveyor loader 12 has a mechanism which pulls the two end chucks 122 slightly to the two end sides of the seal packing 9 in the long direction (2 mm or so). By pulling the two end chucks 122 slightly to the two end sides of the seal packing 9 in the long direction, it is possible to suppress sagging of the seal packing 9 and suppress flapping of the seal packing 9 during conveyance.

In this example, near the center chuck 121, the conveyor loader 12 has a pusher (not shown) which pushes the center of the seal packing 9 in the long direction into the ring-shaped groove 5e of the core plate 5.

FIGS. 10A and 10B are views of the assembly station 13. The assembly station 13 has a workpiece fastening fixture 131, assembly moving parts 132, and two end assembly parts 133.

The workpiece fastening fixture 131 fastens the workpiece W at a predetermined position. The workpiece fastening fixture 131 fastens the workpiece W so that the core plate 5 of the workpiece W faces upward. In this example, the work of setting the workpiece W at the workpiece fastening fixture 131 is performed by a worker.

The assembly moving parts 132 are arranged between one end of the core plate 5 in the long direction and the other end in the long direction. They have the function of pushing locations of the seal packing 9 other than the two ends in the long direction in the groove 5e of the core plate 5.

The two end assembly parts 133 are arranged near the two ends of the core plate 5 in the long direction and have the function of pushing the two ends of the seal packing 9 in the long direction into the ring-shaped groove 5e of the core plate 5.

In this example, four assembly moving parts 132 are provided. Specifically, two assembly moving parts 132 are arranged in the long direction of the core plate 5 of the workpiece W and two are arranged in the short direction of the core plate 5.

When the conveyor loader 12 conveys a seal packing 9 of the provisional placement station 11 to above the workpiece W of the assembly station 13, to avoid the conveyor loader 12 from interfering with the assembly moving parts 132, the assembly moving parts 132 are made retractable to the outside of the core plate 5 in the short direction by a not shown movement mechanism.

Figure 11:
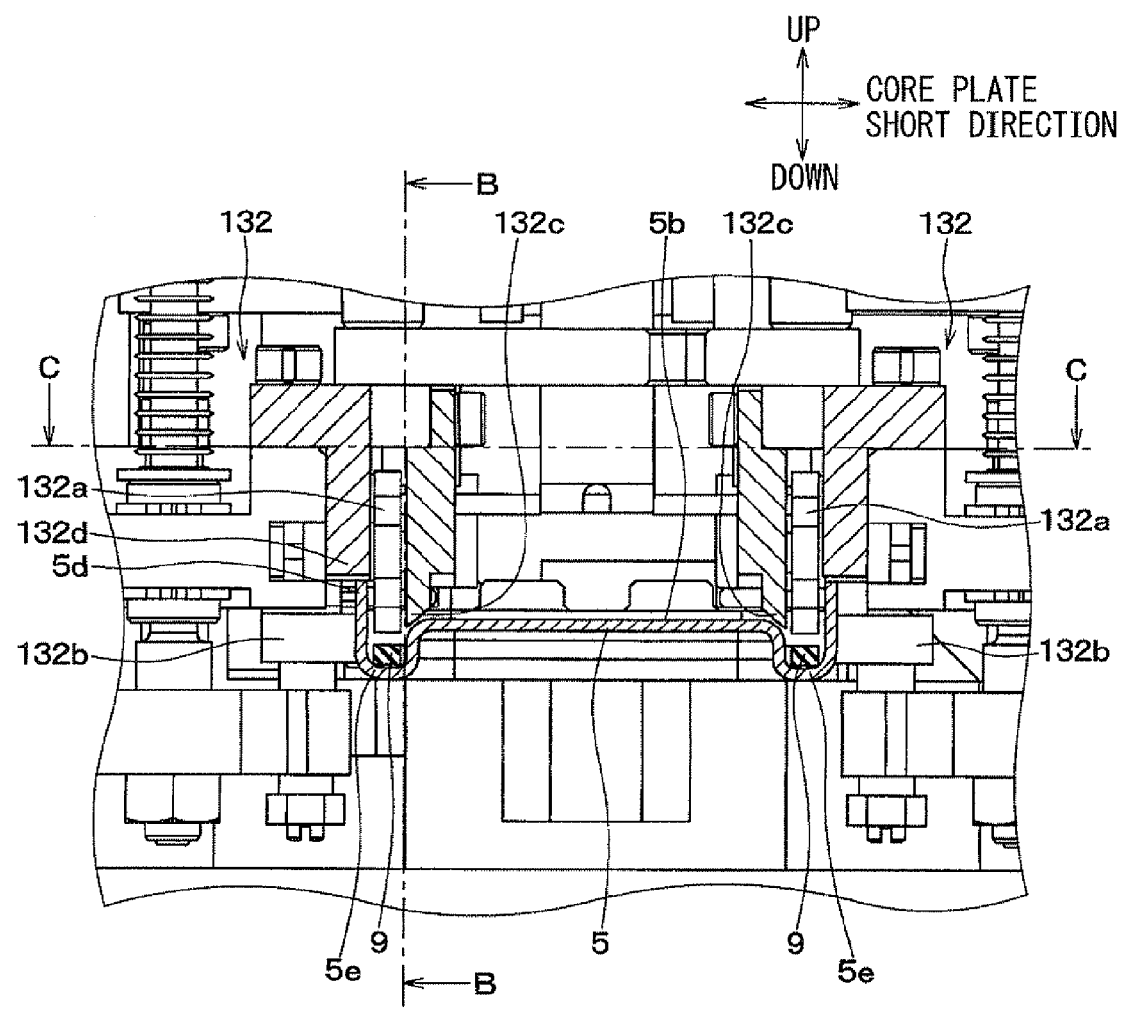
FIG. 11 is a cross-sectional view of an assembly moving part.
Figure 12A:
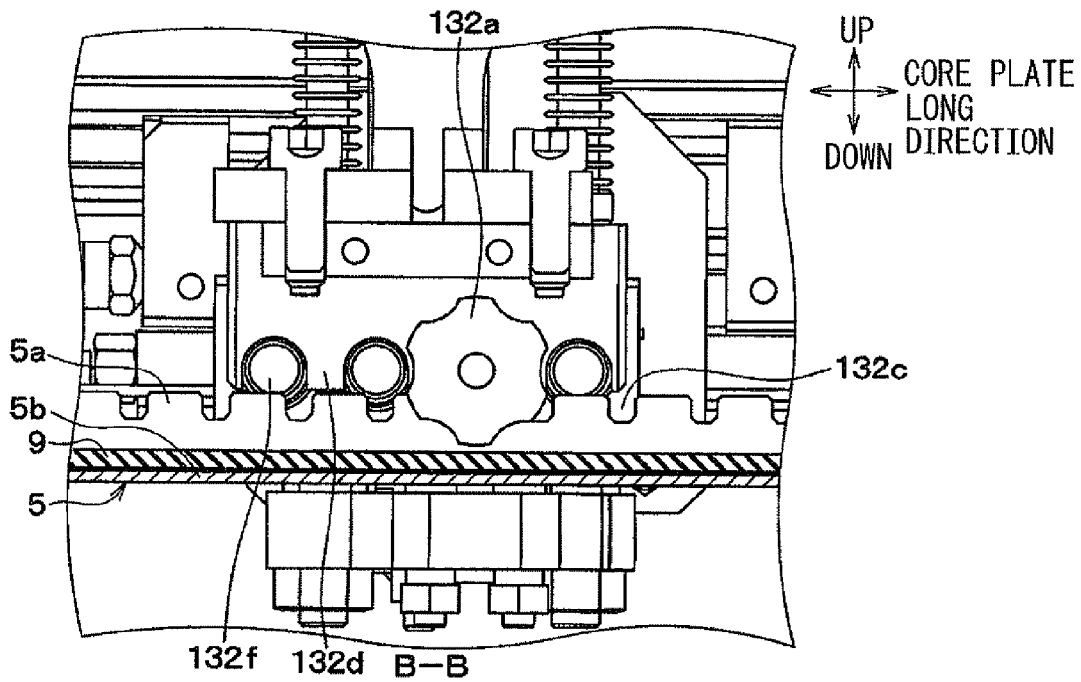
FIGS. 12A and 12B are a cross-sectional view along a line B-B and a cross-sectional view along a line C-C of FIG. 12.
Figure 12B:
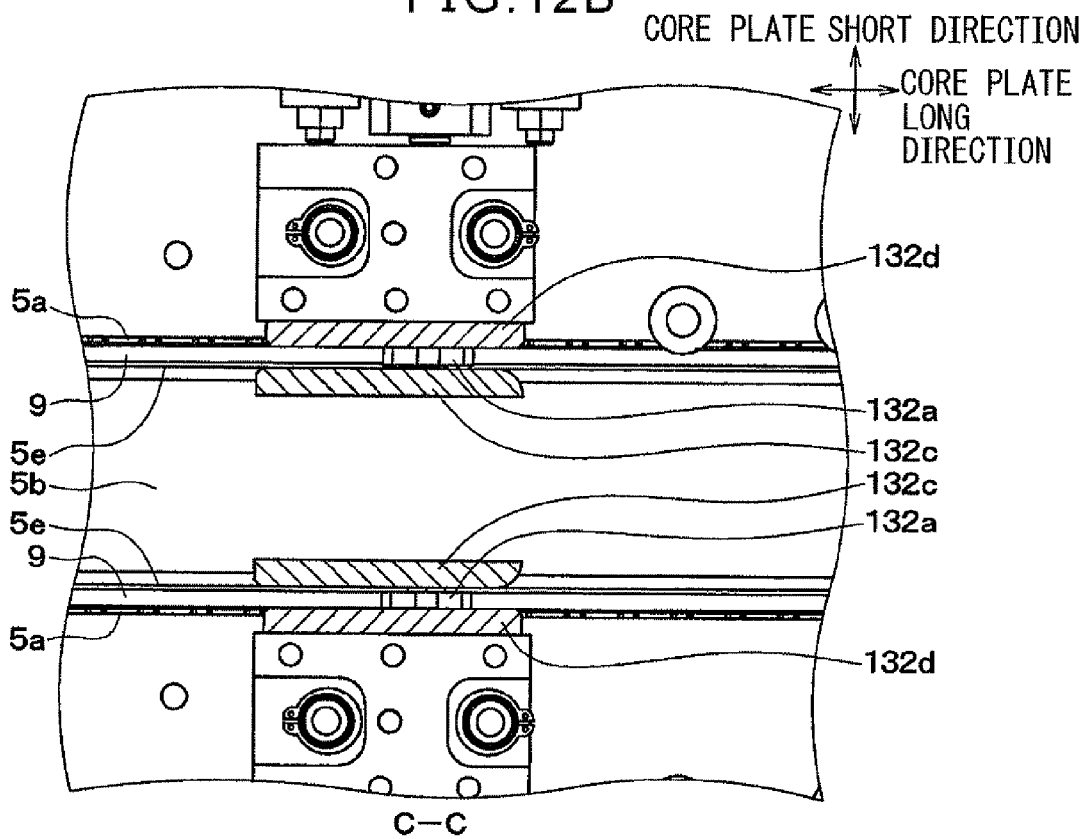

FIG. 11 is a cross-sectional view of an assembly moving part 132 when cut at a cross-section which is perpendicular to the long direction of the core plate 5. FIGS. 12A and 12B are a cross-sectional view along the line B-B and a cross-sectional view along the line C-C of FIG. 11. The assembly moving part 132 has assembly-use rollers 132a, guide rollers 132b, inside guides 132c, and outside guides 132d.

The assembly-use rollers 132a are rollers which push the seal packing 9 into the groove 5e of the core plate 5 while moving rolling in the long direction of the core plate 5. The guide rollers 132b, inside guides 132c, and outside guides 132d are guide members which guide the assembly-use rollers 132a in movement by rotation so as not to deviate from the groove 5e of the core plate 5.

The assembly-use rollers 132a are driven to rotate by a not shown drive device (driving means). In this example, the assembly-use rollers 132a support a pulley. The pulley has a belt stretched around it under tension. Due to the belt drive, the assembly-use rollers 132a turn on their own.

The assembly-use rollers 132a have shafts which extend in the short direction of the core plate 5. As schematically shown in FIGS. 9A and 9B, they push the seal packing 9 to the bottom surface of the groove 5e of the core plate 5 while rotating and moving in the long direction of the core plate 5.

The movement of the assembly-use rollers 132a in the long direction of the core plate 5 is guided by guide rails 132e which are shown in FIG. 9A. By rotational movement of the assembly-use rollers 132a, parts of the seal packing 9 other than the two ends in the long direction are pushed into the groove 5e of the core plate 5.

As shown in FIG. 12A, the outer circumferential shapes of the assembly-use rollers 132a are shapes which are provided with a plurality of relief shapes. Due to this plurality of relief shapes, the assembly-use rollers 132a can push the seal packing 9 into the groove 5e of the core plate 5 well. Specifically, the assembly-use rollers 132a can slide with respect to the seal packing 9 so it is possible to keep the seal packing 9 from sticking to the assembly-use rollers 132a and keep the seal packing 9 from stretching. In this example, the plurality of relief shapes are provided evenly in the circumferential direction.

The guide rollers 132b, inside guides 132c, and outside guides 132d are constructed to move along with the rotational movement of the assembly-use rollers 132a in the long direction of the core plate 5 together with the assembly-use rollers 132a.

Furthermore, the assembly-use rollers 132a, the guide rollers 132b, inside guides 132c, outside guides 132d, and guide rails 132e are designed to be able to displace in accordance with the shape of the heat deformed core plate 5.

Specifically, the floating unit which has the assembly-use rollers 132a, guide rollers 132b, inside guides 132c, outside guides 132d, and guide rails 132e is supported by a not shown floating mechanism. In this example, the floating unit (assembly-use rollers 132a, guide rollers 132b, inside guides 132c, outside guides 132d, and guide rails 132e) are supported in a floating manner to be displaceable in the thickness direction (up-down direction) and long direction of the core plate 5.

As schematically shown in FIG. 9B, the guide rollers 132b are designed to abut against the outside surface of the core plate 5. The floating units 132a to 132e displace in the short direction of the core plate 5 due to the reaction force which the guide rollers 132b receive from the outside surface of the core plate 5.

Due to this, at the soldering step, even if a core plate 5 deforms due to heat in the short direction, the assembly-use rollers 132a can be made to move along the groove 5e of the core plate 5.

The inside guides 132c are designed to abut against the top surface of the tube joining face 5b of the core plate 5. The outside guides 132d are designed to abut against the top ends of the projecting pieces 5a of the core plate 5. In this example, as shown in FIG. 12A, the outside guides 132d have rollers 132f assembled into them.

Due to the reaction force which the inside guides 132c receive from the tube joining face 5b of the core plate 5 and the reaction force which the outside guides 132d receive from the projecting pieces 5a of the core plate 5, the floating units 132a and 132e displace in the thickness direction of the core plate 5 (up-down direction).

Due to this, even if the core plate 5 deforms by heat in the thickness direction in the soldering step, it is possible to make the amount by which the assembly-use rollers 132a push in the seal packing 9 constant.

As explained above, to keep the conveyor loader 12 from interfering with the assembly moving parts 132, the assembly moving parts 132 are designed to be able to retracted to the outside of the core plate 5 in the short direction. At the time of retraction of the assembly moving parts 132, to keep the assembly-use rollers 132a, inside guides 132c, and outside guides 132d from interfering with the projecting pieces 5a of the core plate 5, the assembly-use rollers 132a, inside guides 132c, and outside guides 132d are designed to be able to be retracted to the upward side by a not shown movement mechanism.

Figure 13A:
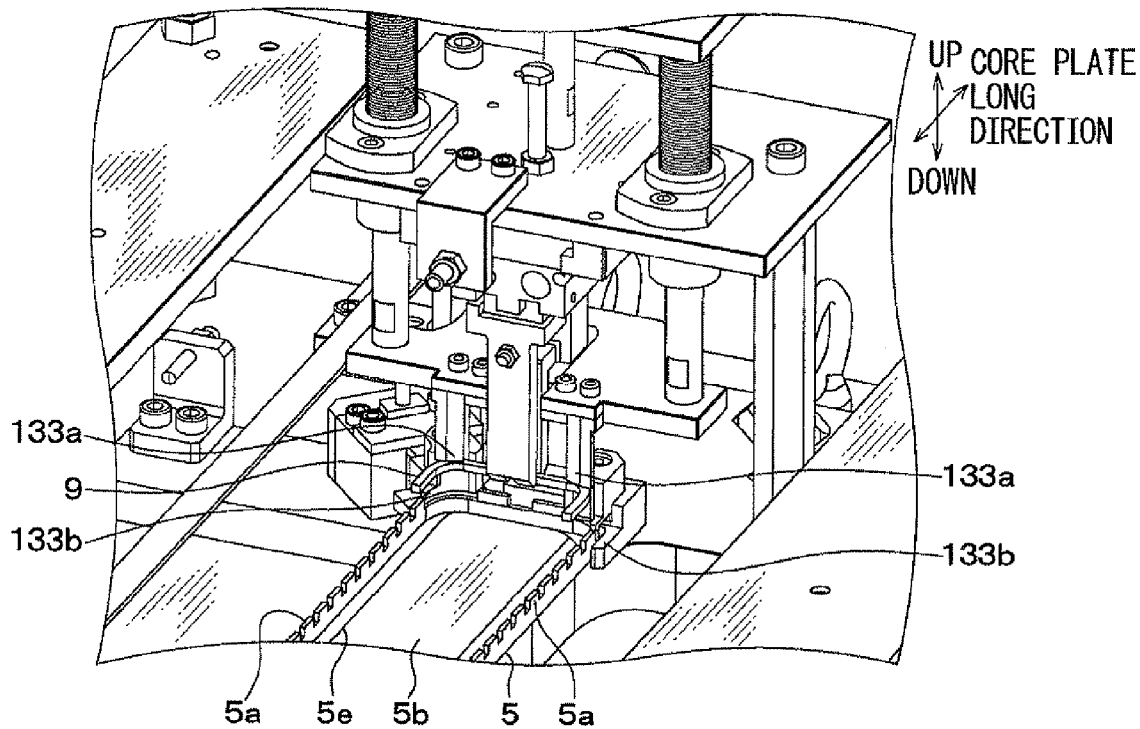
FIGS. 13A and 13B are perspective views which show the two end assembly parts and their vicinities.
Figure 13B:
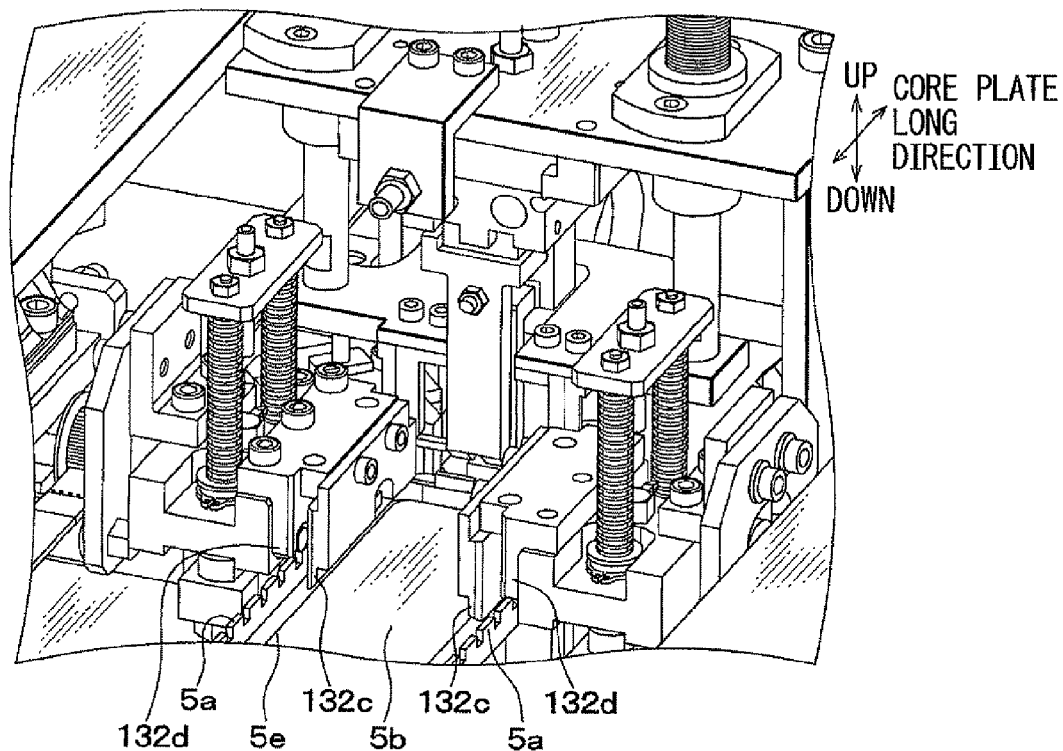
Figure 14:
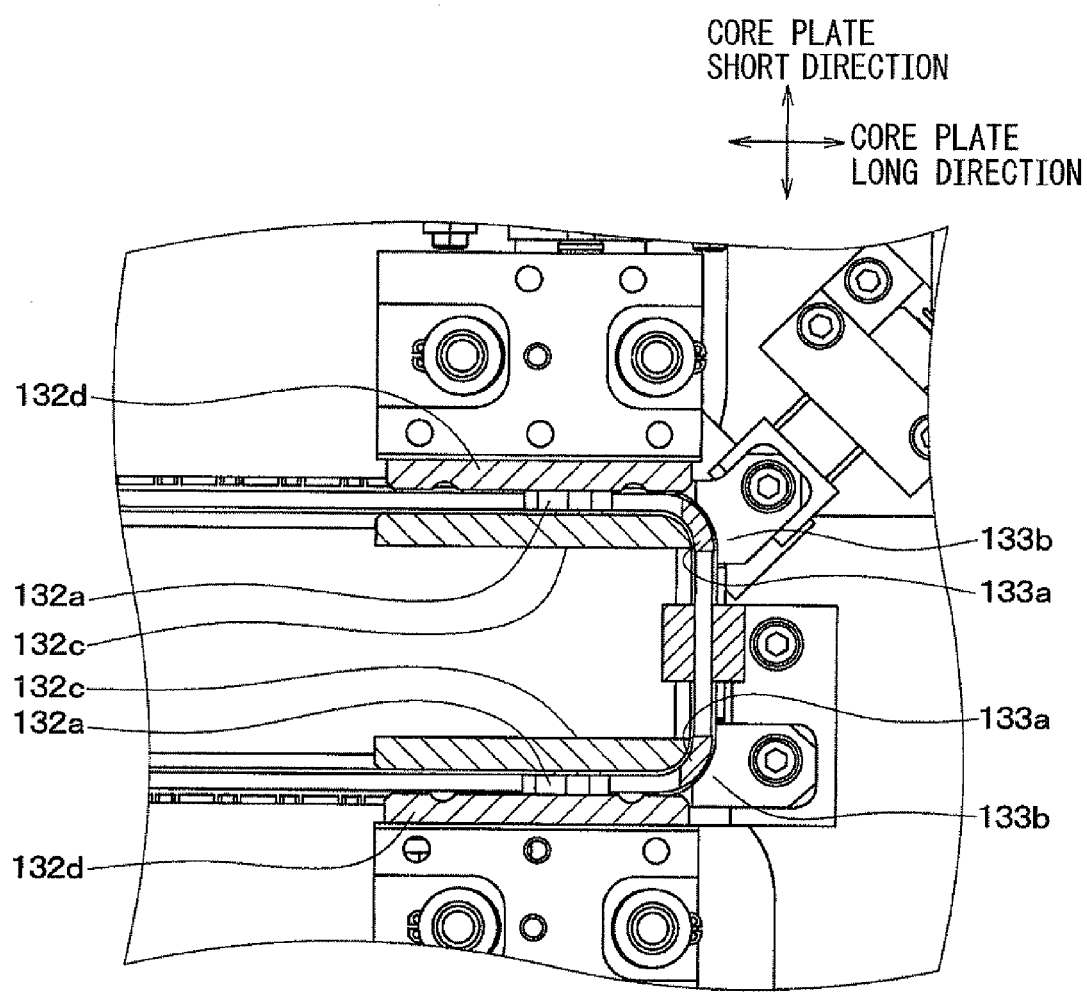
FIG. 14 is a horizontal cross-sectional view of FIG. 13B.

FIGS. 13A and 13B are perspective views which show the two end assembly parts 133 and their vicinities. FIG. 13A shows the state where the assembly moving parts 132 are separated from the two ends of the core plate 5 in the long direction, while FIG. 13B shows the state where the assembly moving parts 132 move to near the two ends of the core plate 5 in the long direction. FIG. 14 is a horizontal cross-sectional view of FIG. 13B.

The two end assembly parts 133 haves pushers 133a and end guides 133b. These pushers 133a and end guides 133b are supported by a not shown floating mechanism in the long direction and the short direction of the core plate 5.

The pushers 133a are members for pushing the corner parts of the seal packing 9 to the corner parts of the groove 5e of the core plate 5 and are driven by not shown actuators in the up-down direction (thickness direction of core plate 5).

The end guides 133b are designed to abut against the outside surfaces of the corner parts of the core plate 5. Due to the reaction force which the end guides 133b receive from the corner parts of the core plate 5, the floating pushers 133a and end guides 133b displace in the long direction and the short direction of the core plate 5. Due to this, even if the core plate 5 deforms due to heat at the time of soldering, the pushers 133a can be prevented from deviation from the groove 5e of the core plate 5. Further, the end guides 133b also perform the role of giving back and forth motion for detachment of the core plate 5.

The control device (not shown) controls the various types of devices which are provided at the above-mentioned provisional placement station 11, conveyor loader 12, and assembly station 13. As the control device, one which has for example a PLC (programmable logic controller) can be used. The control device has an operating panel which is operated by the worker.

Next, the method of using the seal packing assembly apparatus 10 to assemble a seal packing 9 to a core plate 5 (method of assembly of seal packing) will be explained.

First, a worker places a seal packing 9 on the provisional placement table 111 of the provisional placement station 11 and sets the workpiece W on the workpiece fastening fixtures 131 of the assembly station 13, then pushes a startup switch on the operating panel of the control device (not shown). Due to this, the seal packing assembly apparatus 10 automatically assembles the seal packing 9 to the core plate 5.

Specifically, first, the movable pins 112, 113 of the provisional placement station 11 move to center and position the seal packing 9, while in the centered and positioned state, the conveyor loader 12 grips the seal packing 9 by the center chuck 121 and the two end chucks 122.

Next, the conveyor loader 1 conveys the seal packing 9 above the assembly station 13. More specifically, the seal packing 9 is conveyed to right above a core plate 5 of the workpiece W.

At this time, the two end chucks 122 are pulled slightly to the two end sides of the seal packing 9 in the long direction to suppress sagging of the seal packing 9 and suppress flapping of the seal packing 9 during conveyance.

Next, the center chuck 121 of the conveyor loader 12 releases the center part of the seal packing 9 in the long direction, while the pusher (not shown) of the conveyor loader 12 pushes the center part of the seal packing 9 in the long direction into the groove 5e of the core plate 5. At this time, the two end chucks 122 of the conveyor loader 12 continue holding the seal packing 9, so the seal packing 9 rises up from the core plate 5 at the locations other than the center part in the long direction.

Next, as schematically shown in FIG. 9A, the assembly-use rollers 132a rotate while pushing the seal packing 9 against the bottom surface of the groove 5e of the core plate 5. Due to this, the assembly-use rollers 132a are guided by the guide rails 132e while moving from the center part side of the core plate 5 in the long direction toward the two end sides in the long direction. For this reason, the parts other than the two ends of the seal packing 9 in the long direction are pushed from the center side in the long direction toward the two end sides in the long direction successively in the groove 5e of the core plate 5.

At this time, as schematically shown in FIG. 9B, the guide rollers 132b, inside guides 132c, and outside guides 132d contact the different parts of the core plate 5. As explained above, the assembly-use rollers 132a, guide rollers 132b, inside guides 132c, outside guides 132d, and guide rails 132e are supported in a floating manner.

For this reason, due to the reaction force which the guide rollers 132b, inside guides 132c, and outside guides 132d receive from the different parts of the core plate 5, the assembly-use rollers 132a are displaced matching the shape of the core plate 5. Due to this, even when the core plate 5 deforms by heat at the time of soldering, the assembly-use rollers 132a can be made to move while rotating along the groove 5e of the core plate 5 and reliably push in the seal packing 9 to the groove 5e of the core plate 5.

When the assembly moving parts 132 reach the vicinity of the two ends of the core plate 5 in the long direction, the two end chucks 122 of the conveyor loader 12 release the two ends of the seal packing 9 in the long direction. At the same time as this, the pushers 133a of the two end assembly parts 133 push the corner parts of seal packing 9 into the corner parts of the groove 5e of the core plate 5.

At this time, as shown in FIG. 14, the end guides 133b of the two end assembly parts 133 abut against the outside surfaces of the corner parts of the core plate 5. As explained above, the pushers 133a and end guides 133b are supported in a floating state.

For this reason, due to the reaction force which the end guides 133b receive from the outside surfaces of the corner parts of the core plate 5, the pushers 133a displace along the positions of the corner parts of the core plate 5. Due to this, even if the core plate 5 deforms by heat at the time of soldering, the pushers 133a can reliably push the corner parts of the seal packing 9 into the corner parts of the groove 5e of the core plate 5.

In this way, the assembly of a seal packing 9 to the groove 5e of the core plate 5 is completed.

According to the assembly apparatus of the present embodiment, the assembly-use rollers 132a push the seal packing 9 in from the center side in the long direction toward the two end sides, so it is possible to shift the extra length of the seal packing 9 to the two ends sides of the groove 5e of the core plate 5 in the long direction.

As shown in FIG. 4B, at the two ends of the groove 5e of the core plate 5 in the long direction, there is extra space for holding the seal packing 9, so it is possible to absorb the extra length of seal packing 9 at the two end sides of the groove 5e of the core plate 5 in the long direction.

Further, at the two end sides of the groove 5e of the core plate 5 in the long direction, the pushers 133a push the corner parts of the seal packing 9 into the corner parts of the groove 5e of the core plate 5, so the excess length of the seal packing 9 can be pushed inside the groove 5e of the core plate 5.

Further, the assembly-use rollers 132a and pushers 133a are supported in a floating manner and displaced matching the shape of the core plate 5, so even if the core plate 5 deforms by heat at the time of soldering, the assembly-use rollers 132a and pushers 133a can reliably push the seal packing 9 into the groove 5e of the core plate 5. In particular, when the seal packing 9 is an angular packing, it is possible to prevent twisting of the seal packing 9.

Further, the provisional placement station 11 evenly extends the seal packing 9 in both directions in the long direction and grips the center part of the seal packing 9 in the long direction, which is evenly extended in both directions in the long direction, by the conveyor loader 12, so it is possible to mechanically pick up the center position of the seal packing 9 in the long direction.

For this reason, when using the assembly-use rollers 132a to push the seal packing 9 from the center side in the long direction toward the two end sides, it is possible to shift the excess length of the seal packing 9 evenly to the two ends in the long direction. As a result, it is possible to reliably absorb excess length of seal packing 9 at the two ends of the groove 53 of the core plate 5 in the long direction.

In the above-mentioned embodiment, the explanation was given with reference to the example of the seal packing assembly apparatus and method of assembly of seal packing which assemble seal packing at the core plate of a component of an automobile radiator, but the present invention can be applied to a seal packing assembly apparatus and method of assembly of seal packing which assembles seal packing at the core plate of a component of various heat exchangers.

While the invention has been described with reference to specific embodiments chosen for purpose of illustration, it should be apparent that numerous modifications could be made thereto by those skilled in the art without departing from the basic concept and scope of the invention.

The invention claimed is:

1. A seal packing assembly apparatus which assembles a seal packing into a core plate used as a component of a heat exchanger, the apparatus comprising:
   rollers that push a seal packing into a groove of a core plate while moving by rolling along the groove;
   guide members that abut against the core plate; and
   pushers that push two ends of the seal packing in a long direction into two ends of the groove in the long direction,
   the rollers being supported so as to displace along a shape of the core plate by a reaction force which the guide members receive from the core plate, and the rollers move by rolling in the groove from a center side in the long direction to the two ends of the groove in the long direction.

2. A seal packing assembly apparatus which assembles a seal packing into a core plate used as a component of a heat exchanger, the apparatus comprising:
- rollers that push a seal packing into a groove of a core plate while moving by rolling along the groove;
- guide members that abut against the core plate, and
- the rollers being supported so as to displace along a shape of the core plate by a reaction force which the guide members receive from the core plate, the seal packing assembly apparatus being provided with a provisional placement table on which the seal packing is provisionally placed, an extending mechanism which evenly extends the seal packing, which was provisionally placed on the provisional placement table, in both directions in the long direction, and conveying means which grip the seal packing which was evenly extended by the extending mechanism in both directions in the long direction and convey it to near the core plate.

3. A method of assembly of seal packing which uses a seal packing assembly apparatus to assemble a seal packing in the core plate, the seal packing assembly apparatus assembles a seal packing into a core plate used as a component of a heat exchanger and comprises:
- rollers that push a seal packing into a groove of a core plate while moving by rolling along the groove;
- guide members that abut against the core plate, and
- the rollers being supported so as to displace along a shape of the core plate by a reaction force which the guide members receive from the core plate.

* * * * *